United States Patent
Jackowski et al.

(10) Patent No.: US 10,208,629 B2
(45) Date of Patent: Feb. 19, 2019

(54) PIEZO-ELECTRIC MOTOR FOR BOWED ROTOR MITIGATION

(71) Applicant: The Boeing Company, Chicago, IL (US)

(72) Inventors: Jason J. Jackowski, Everett, WA (US); Kent E. Karnofski, Lake Forest Park, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/475,855

(22) Filed: Mar. 31, 2017

(65) Prior Publication Data

US 2018/0283219 A1    Oct. 4, 2018

(51) Int. Cl.
| | | |
|---|---|---|
| *F01D 25/36* | (2006.01) | |
| *F02C 7/32* | (2006.01) | |
| *F01D 19/02* | (2006.01) | |
| *B64D 27/18* | (2006.01) | |
| *H02N 2/10* | (2006.01) | |

(52) U.S. Cl.
CPC ............. *F01D 25/36* (2013.01); *B64D 27/18* (2013.01); *F01D 19/02* (2013.01); *F02C 7/32* (2013.01); *H02N 2/10* (2013.01); *F05D 2220/323* (2013.01); *F05D 2220/70* (2013.01); *F05D 2240/60* (2013.01); *F05D 2270/114* (2013.01)

(58) Field of Classification Search
CPC . F01D 25/36; F01D 19/02; F02C 7/32; F05D 2220/223; F05D 2220/70; H02N 2/10; H02N 2/12; H02N 2/123; H02N 2/16; H02N 2/163; H02N 2/166; F02B 73/00; B60K 6/00
USPC .......................... 310/323.01–323.21; 60/698
See application file for complete search history.

(56) References Cited

U.S. PATENT DOCUMENTS

| | | | |
|---|---|---|---|
| 8,820,046 B2 | 9/2014 | Ross et al. | |
| 2005/0162042 A1* | 7/2005 | Krill | ........................ H02N 2/10 310/328 |
| 2013/0091850 A1 | 4/2013 | Francisco | |
| 2016/0348588 A1 | 12/2016 | Ross et al. | |
| 2017/0082029 A1 | 3/2017 | Zipperer | |

FOREIGN PATENT DOCUMENTS

| | | |
|---|---|---|
| EP | 2305986 | 4/2011 |
| EP | 2602458 | 6/2013 |
| EP | 3051074 | 8/2016 |
| EP | 3211184 | 8/2017 |
| WO | 2013072291 | 5/2013 |

OTHER PUBLICATIONS

Extended European Search Report dated Jun. 4, 2018 for European Patent Application No. 18160131.1.

\* cited by examiner

*Primary Examiner* — Derek Rosenau
(74) *Attorney, Agent, or Firm* — Gates & Cooper LLP (57) ABSTRACT

A piezoelectric motor comprising one or more concentric stator rings arranged to transfer energy and provide torque to an engine rotor or to an engine transmission. Such a piezoelectric motor improves spatial integration of an engine turning motor in a gas turbine engine.

20 Claims, 13 Drawing Sheets

FIG. 11

PIEZO-ELECTRIC MOTOR FOR BOWED ROTOR MITIGATION

BACKGROUND

1. Field

The present disclosure relates to a system for rotating a rotor in a gas turbine engine.

2. Description of the Related Art

Figure 1A:
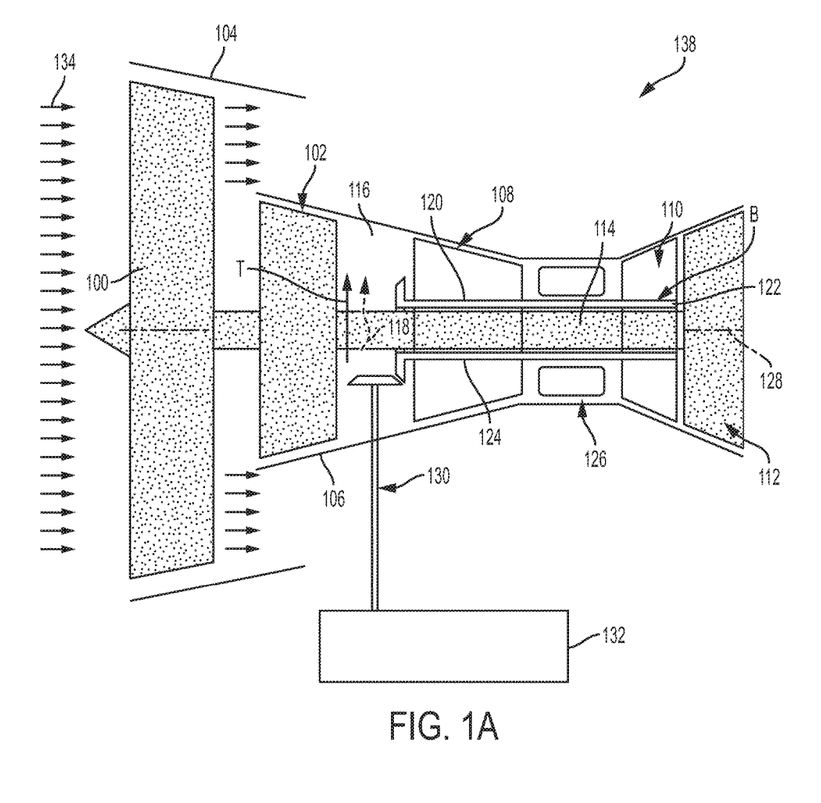
FIG. 1A illustrates a gas turbine engine.
Figure 1B:
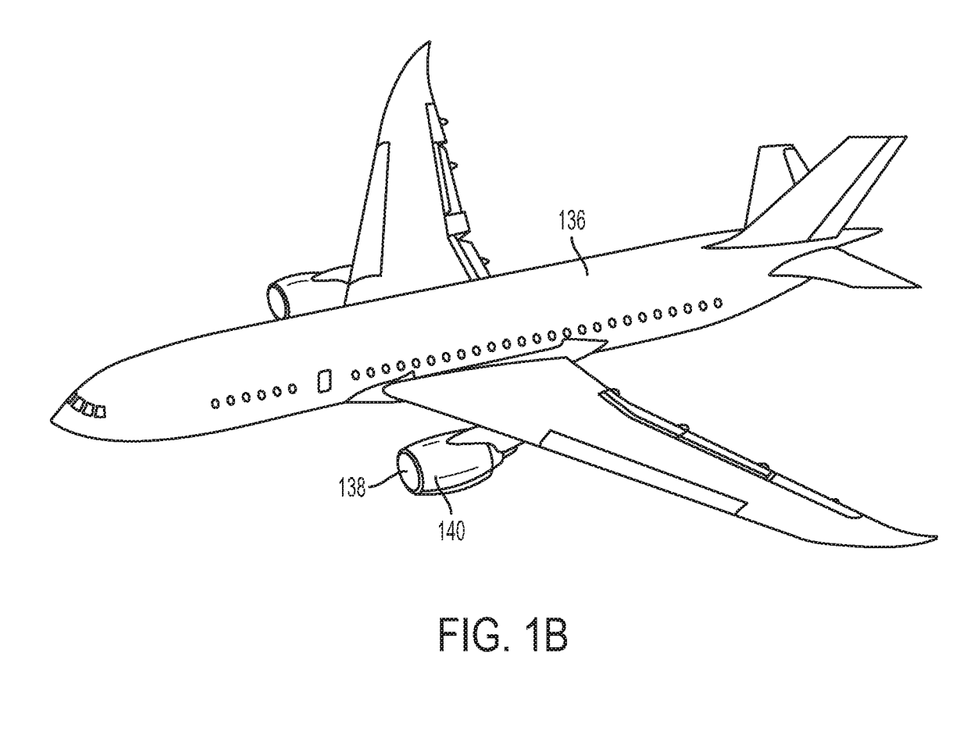
FIG. 1B illustrates the gas turbine engine mounted in a nacelle on an aircraft.

FIG. 1A illustrates an aircraft engine comprising a fan 100, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. After engine shutdown on the ground, residual hot air 116 in the engine core rises 118 and is trapped by the engine casing 106. As the hot air rises 118, the upper portion 120 of the HP compressor's (engine's rotor) 108 rotor shaft 122 becomes hotter than the lower portion 124 of the rotor shaft 122 and causes uneven cooling and thermal deformation of the engine rotor shaft 122 (i.e., rotor bowing, where the upper portion 120 of the rotor shaft 122 becomes longer than the lower portion 124). Upon engine restart (e.g., prior to fuel ignition in the combustor 126), even tiny fractions of rotor shaft bowing can cause the HP compressor (engine's rotor) 108 to rub against the engine's casing 106. The rub causes vibrations (manifested as disconcerting noise in the aircraft cabin) or even damage to the aircraft (e.g., engine damage, damage to the engine case lining, damage to the air pre-cooler used by the environmental control system, or damage to other accessories). Also illustrated are the rotor shaft's 122 longitudinal axis 128, transmission 130 connecting a gearbox 132 to the rotor shaft 122, and air 134 inputted into the engine during operation. FIG. 1B illustrates that on an aircraft 136, the engine 138 is housed in a nacelle 140. The nacelle 140 may also trap rising 118 hot air 116 that causes a temperature gradient T.

One method to mitigate these problems is to build the engine with wider cold build clearances ("opened up" clearances), so that the compressor rotor shaft 122 can bow without causing blades to rub on the engine casing 106. However, more advanced engine designs prefer less "gap" between the engine casing and the compressor rotors (tighter "cold build clearances") to reduce air leakage and improve thrust specific fuel consumption (TSFC). Thus, the overriding need to reduce fuel consumption renders wider cold build clearances less desirable. Indeed, as ever tighter cold build clearances are implemented, the problems caused by engine rub will become more severe.

Conceivably, an engine architecture could add rotor stiffening or bearing arrangements to reduce the amount of rotor shaft bow that is physically possible. However, these architecture changes would add weight and manufacturing cost to the engine.

Other methods of mitigating rotor shaft bow comprise rotating the shaft (1) so that the shaft cools uniformly, returns to thermal equilibrium, and straightens, and/or (2) so that centrifugal forces straighten the bow. The shaft rotation is achieved (1) by motoring the engine at relatively low revolutions per minute (RPM) after starting the engine (but before running the engine at high RPM) and/or (2) using an Engine Turning Motor (ETM) to turn the rotor shaft when the engine is off.

However, conventional methods for providing power to the ETM or the engine so as to straighten the bow can be problematic. Some smaller aircraft, such as the Boeing 737 airplane, fly into remote airports where facility power is not available to power the ETM or engine. Furthermore, auxiliary power unit (APU) power on the aircraft is not always available to power the engine or ETM because some airports limit APU use at gates due to emissions and noise concerns and aircraft are not powered when they are towed between gates. In addition, airplanes may operate with a nonfunctional APU or the powering of the ETM or engine may cause undesirable APU wear (extended motoring prolongs the APU's exposure to main engine start (MES) mode, reducing APU life). Finally, the use of lithium-ion and nickel-cadmium batteries for powering the ETM is problematic due to high failure rates and flammability concerns associated with the engine environment (extreme heat, extreme cold, and high vibration).

Moreover, rotating the shaft shortly before departure causes departure delays, especially if reduced engine clearances require turning the rotor at low speeds. These delays not only inconvenience the passengers but also increase costs associated with increased waiting times and parking fees.

What is needed then, is a more efficient method for mitigating rotor shaft bowing that simplifies ground logistics. The present disclosure satisfies this need.

SUMMARY

The present disclosure describes an aircraft engine assembly comprising a rotor shaft and means for rotating the rotor shaft using a piezoelectric motor.

In one embodiment, the piezoelectric motor comprises one or more stators and one or more rotor members disposed around a shaft, wherein the rotor members are connected or attached to the shaft. In one embodiment, the shaft is the rotor shaft itself. In another embodiment, the shaft is a drive shaft in a transmission driving the rotor shaft. The one or more rotor members rotate when the one or more stators press against the one or more rotor members in response to one or more electric fields applied by a circuit onto the one or more stators. The connection or attachment between the rotor members and the shaft allows rotation of the rotor members to be transferred to the shaft.

In one embodiment, the electric field generates one or more traveling waves in the stators. The one or more traveling waves press against one or more rotor members so as to rotate the rotor members and the shaft connected to the rotor members.

In yet another embodiment, the one or more stators each comprise piezoelectric actuators disposed in a concentric ring around the shaft. The actuators (e.g., each comprising a finger) sequentially press against a surface of a rotor member when the one or more electric fields are sequentially applied to each of the actuators, thereby delivering torque or mechanical output to the surface of the rotor member.

In yet another embodiment, a plurality of the stators press against different radial positions on a surface of a rotor member.

In yet a further embodiment, the piezoelectric motor comprises a plurality of the stators and a plurality of the rotor members alternately disposed in a stack or in pairs.

In yet another embodiment, a plurality of piezoelectric actuators are disposed on an inner surface of an annulus around the shaft. The shaft rotates when the actuators sequentially press against an outer surface of the shaft in response to the electric fields.

The present disclosure further describes a method of rotating a rotor shaft in an aircraft engine, comprising driving a shaft in the aircraft engine using a piezoelectric motor so that the rotating reduces or prevents thermal bowing of the rotor shaft in a temperature gradient.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

The present disclosure describes means for mounting a piezoelectric motor on a shaft so as to drive rotation of a rotor shaft in a gas turbine engine. The rotor shaft has a longitudinal axis and is housed in a casing 106 and nacelle 140 that traps air 116 after engine shut down, creating a temperature gradient perpendicular to the longitudinal axis. The rotation reduces or prevents thermal bowing of the rotor shaft in the temperature gradient.

A piezoelectric motor is mounted on the rotor shaft and/or on a drive shaft (e.g., a tower shaft or a shaft in an auxiliary gearbox) in a transmission connected to the rotor shaft. The transmission may include a clutch that engages the drive shaft to the rotor shaft.

Several examples of the means for rotating the rotor using the piezoelectric motor are further described below.

First Installation Example

Figure 2:
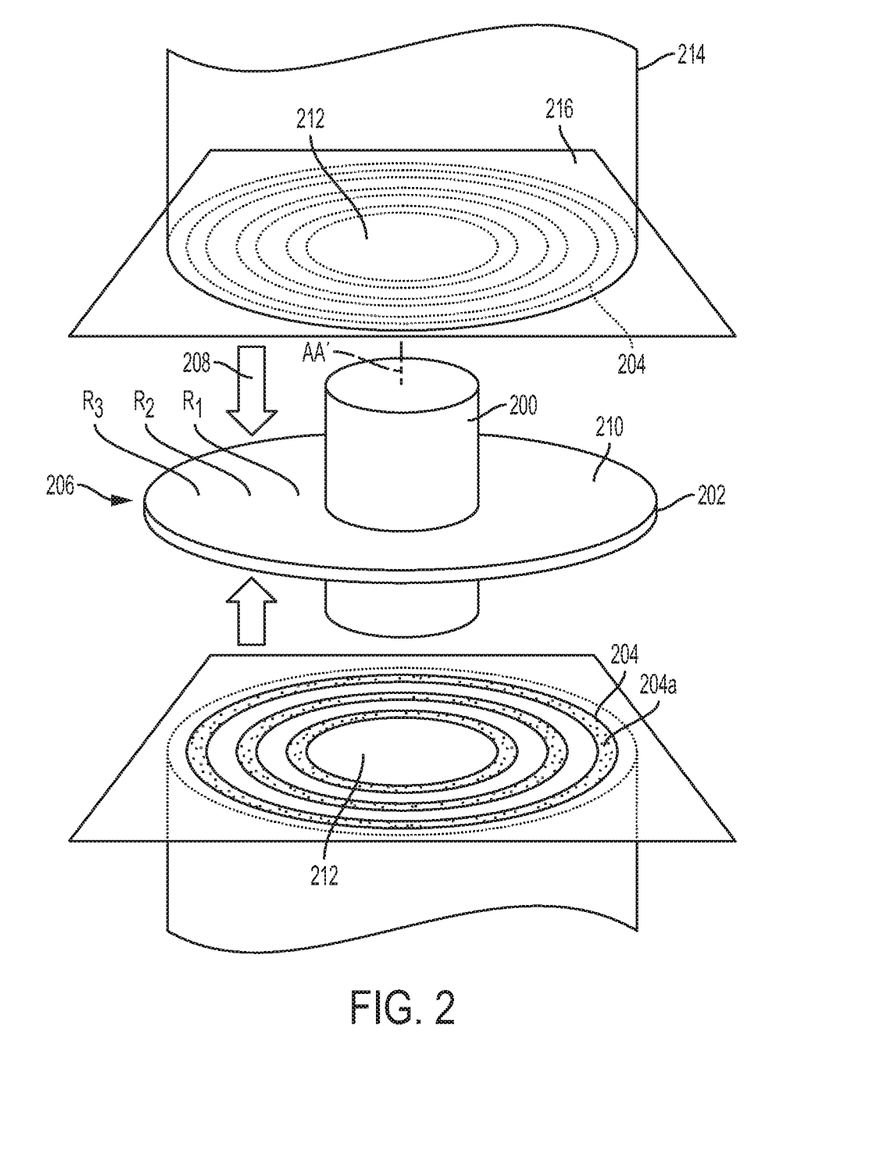
FIG. 2 illustrates an installation comprising piezoelectric stators surrounding a shaft, and a rotor member surrounding and connected to the shaft, according to one or more embodiments.

FIG. 2 illustrates assembly of a piezoelectric motor on a shaft 200 so that the piezoelectric motor rotates the shaft 200 in response to one or more applied electric fields. The piezoelectric motor comprises a rotor member 202 and stators 204. The assembly comprises attaching a disc or annulus 206 to the shaft 200, or providing the shaft including the disc or annulus 206, wherein the disc 206 or annulus comprises the rotor member 202. The assembly further comprises positioning 208 two sets of the stators 204 on each side of the rotor member 202 so that the rotor member 202 is sandwiched between two stators 204 or stator halves, with each rotor member 202 having an outward surface 210 facing at least one stator 204 in a direction parallel to the shaft's longitudinal axis AA'.

The stators 204 are discs or annuli mounted so that the shaft 200 goes through a hollow center 212 in the stators 204 and the stators 204 comprise concentric rings 204a applying torque to both sides or surfaces 210 of the rotor member 202.

FIG. 2 further illustrates a housing 214 constructed to structurally support the stators 204. The stators 204 are attached to boards 216 and the housing 214 comprises a cylinder whose walls mount the boards 216. The rotor member 202 and the shaft 200 are free to rotate in this assembly.

Figure 3:
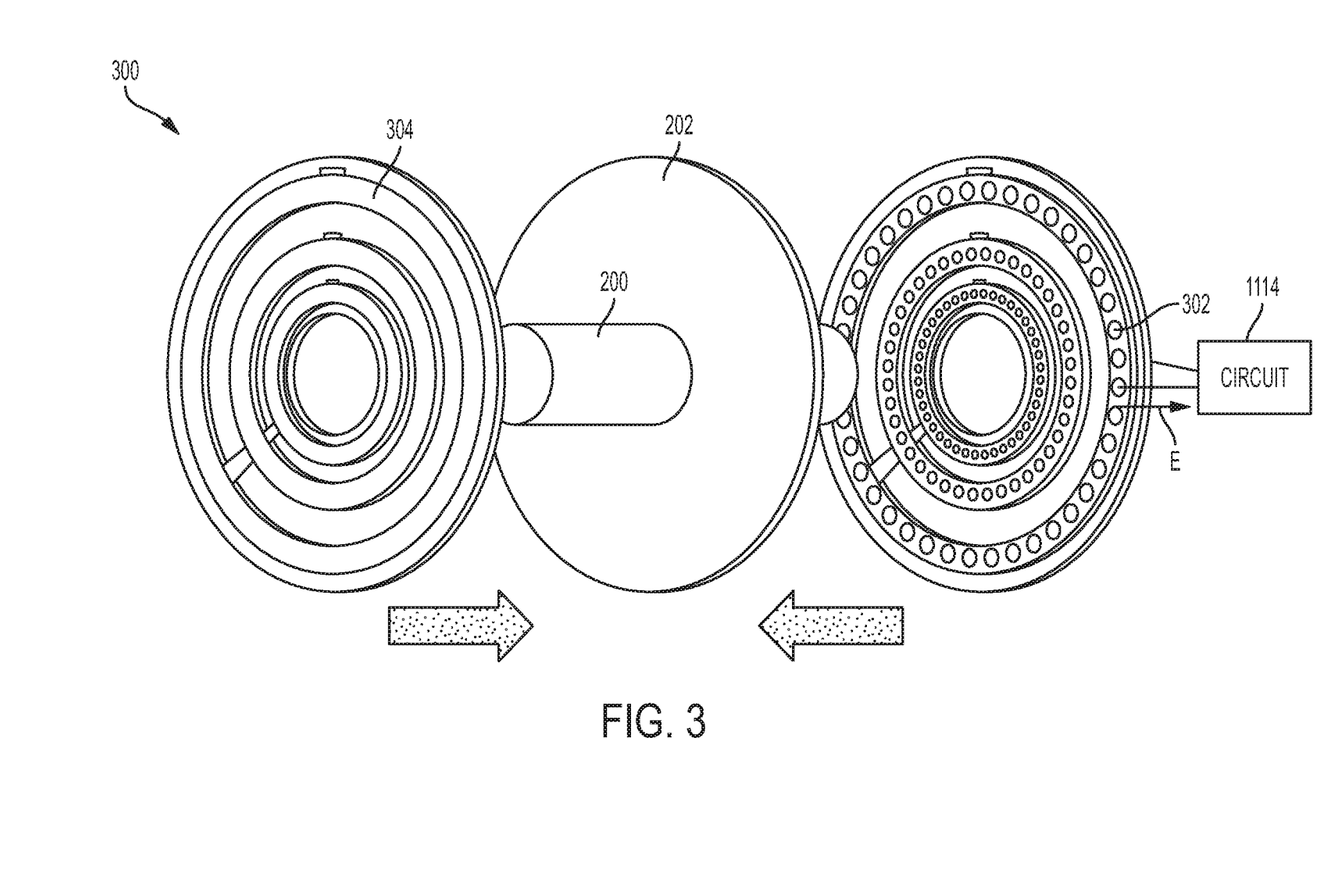
FIG. 3 illustrates an embodiment wherein the stator comprises actuators.

FIG. 3 shows an example wherein each stator 300, 204 comprises piezoelectric actuators 302 or components disposed in a concentric ring 304 around the shaft 200. The rings 304 are disposed on a stator disc. FIG. 3 further illustrates a circuit 1114 connected to the one or more stators 204, wherein the shaft 200 rotates when the one or more stators 204 press against the one or more rotor members 202 in response to one or more electric fields E applied by the circuit 1114 onto the one or more stators 204.

Figure 4:
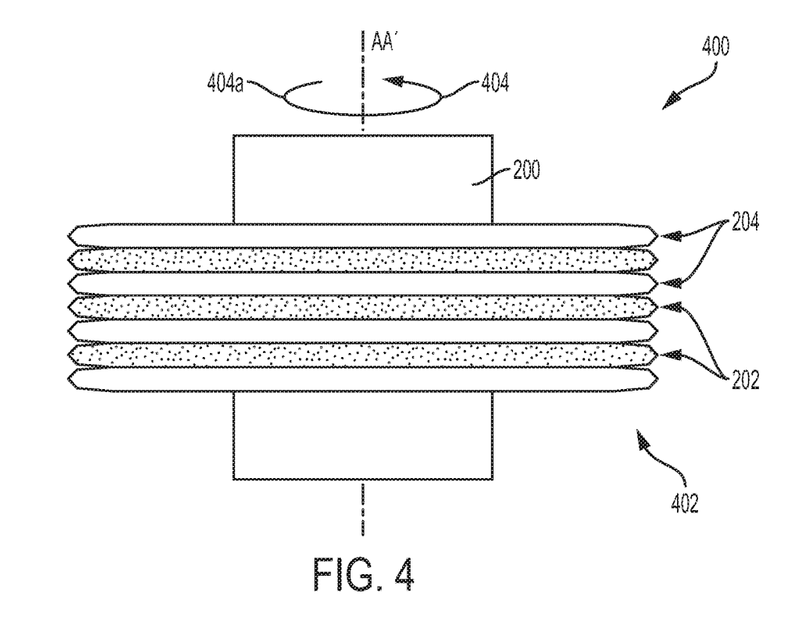
FIG. 4 illustrates a plurality of the stators and a plurality of the rotor members alternately disposed in a stack, according to one or more embodiments.

FIG. 4 illustrates a piezoelectric motor 400 comprising a stack 402 of alternating stators 204 (comprising concentric rings) and rotor members 202 (comprising discs). The rotor members 202 are connected to the shaft 200. In one embodiment, the stack 402 increases torque output to rotate 404 the shaft 200 about axis AA' of the shaft 200.

Second Installation Example

Figure 5:
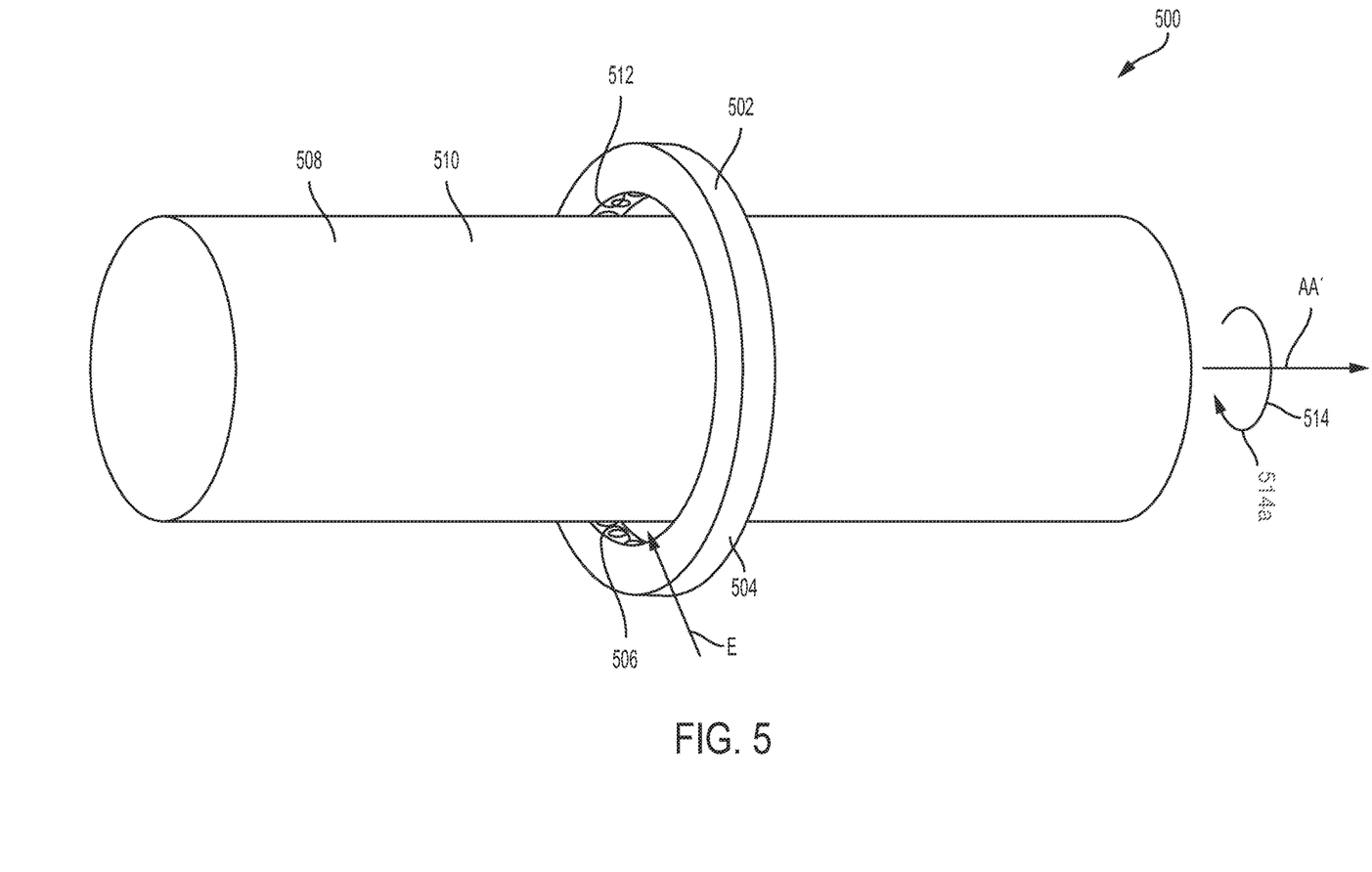
FIG. 5 illustrates an installation wherein the piezoelectric motor applies torque directly to an engine or drive shaft, according to one or more embodiments.

FIG. 5 illustrates a piezoelectric motor 500 comprising a stator 502, wherein the stator 502 comprises a ring or annulus 504 including actuators 506 acting directly upon an outer surface 508 of the shaft 510. In this embodiment, the piezo-electric actuators 506 are positioned and oriented on an inner surface 512 of the annulus or ring 504 so as to act inward toward the center or longitudinal axis AA' of the shaft 510. In this embodiment, the shaft 510 becomes the application rotor. Application of electric fields E to the actuators 506 rotates 514 the shaft 510 about axis AA'.

This configuration eliminates the need for a separate piezoelectric rotor member, decreasing weight and spatial volume.

In one embodiment, the stator 502 is mounted on the surrounding engine structure, such as, but not limited to, at a bearing location.

Piezoelectric Motor Actuation

Figure 6:
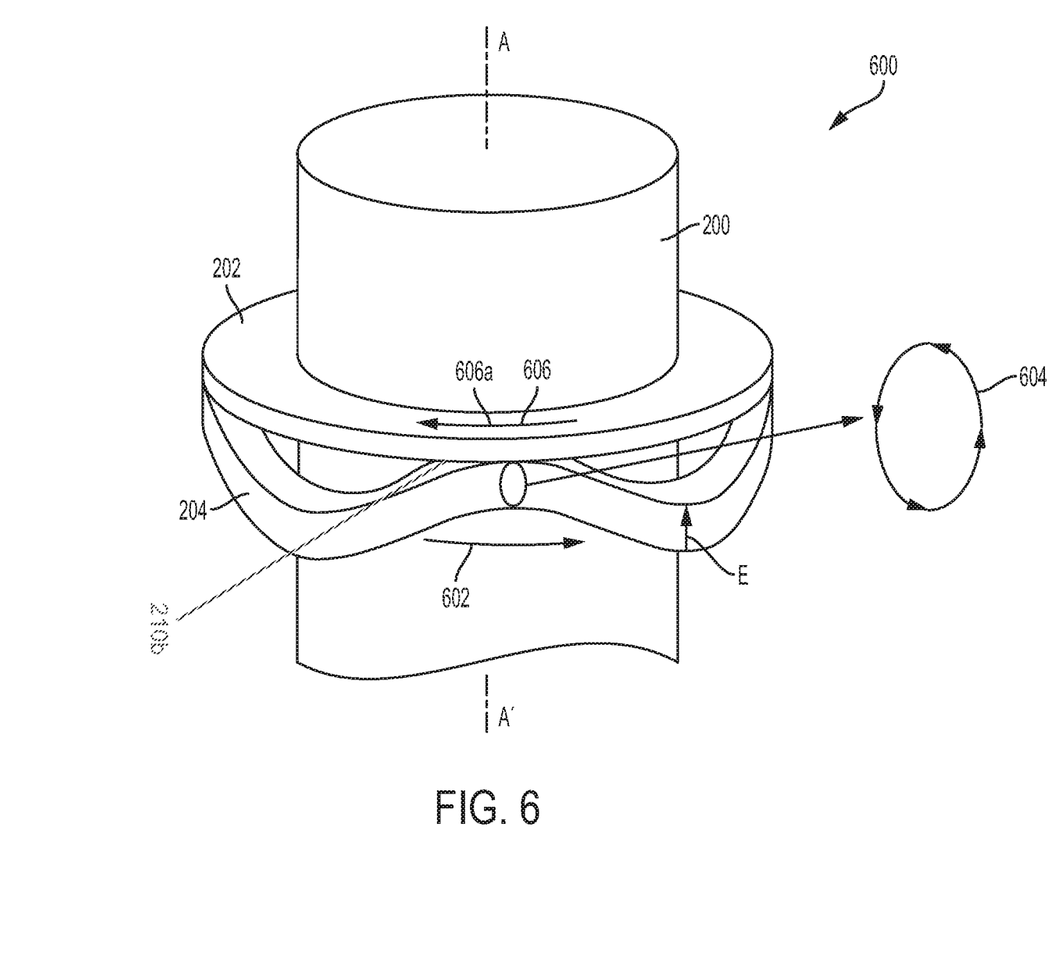
FIG. 6 illustrates a traveling wave in the stator pressing the stator onto the rotor member, according to one or more embodiments.

FIG. 6 illustrates a piezoelectric motor 600 comprising a stator 204 and a rotor member 202. One or more electric fields E applied to the stator 204 generate a traveling wave 602 on the surface the stator 204. The traveling wave 602, on the flexible stator surface, presses against the rotor member 202, producing elliptical motion 604 at the contact interface 210b with the rotor member 202. The elliptical motion 604 of the contact interface 210b propels the rotor member 202 so as to rotate 606 the rotor member 202 and the shaft 200 connected to the rotor member 202. The elliptical motion 604 is formed by orbital motion of particles (electrons) in the stator 204 induced by the electric fields E.

The positioning and addressing of individual actuators 506, 302 allows precise control of the piezo-electric components/actuators.

Figure 7A:
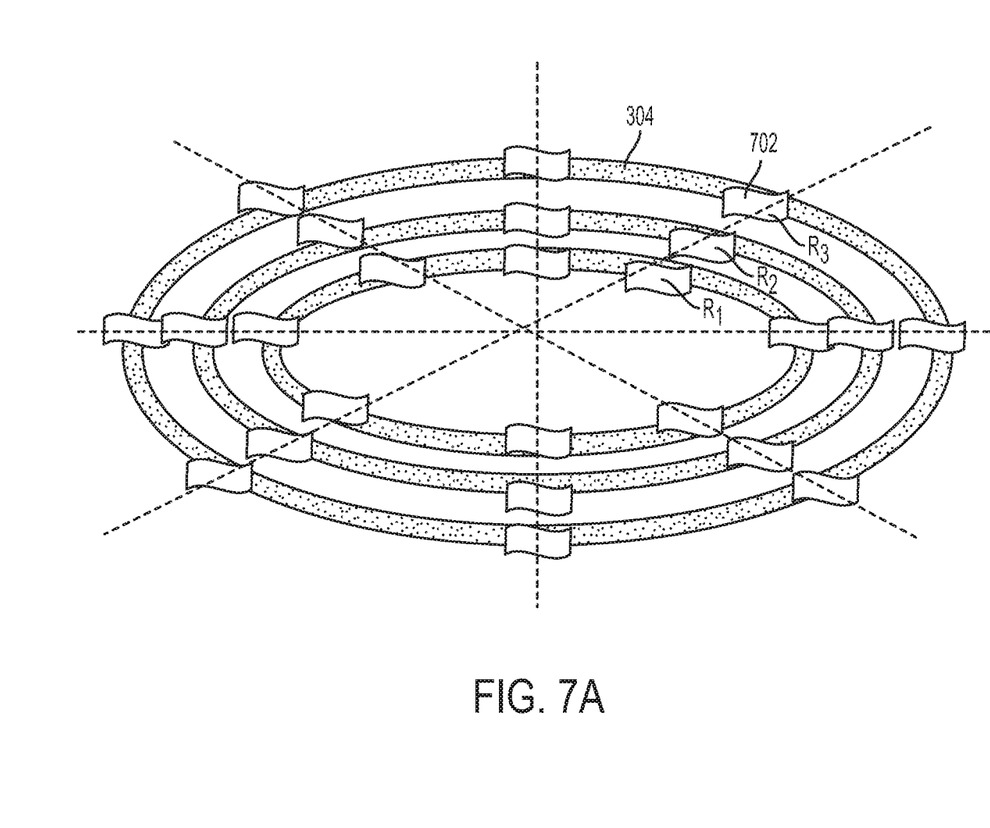
FIG. 7A illustrates piezoelectric actuators on a series or plurality of concentric rings being turned on sequentially, according to one or more embodiments.

FIG. 7A illustrates the piezoelectric components/actuators 302 on the concentric stator rings 304 are turned on in a sequence so as to create the traveling/standing waves 702 that press on the rotor member 202 at the same time and at the same angular position (but at different radial positions R1, R2, R3). In this way, the traveling waves 702 on the stators 204 are aligned.

Figure 7B:
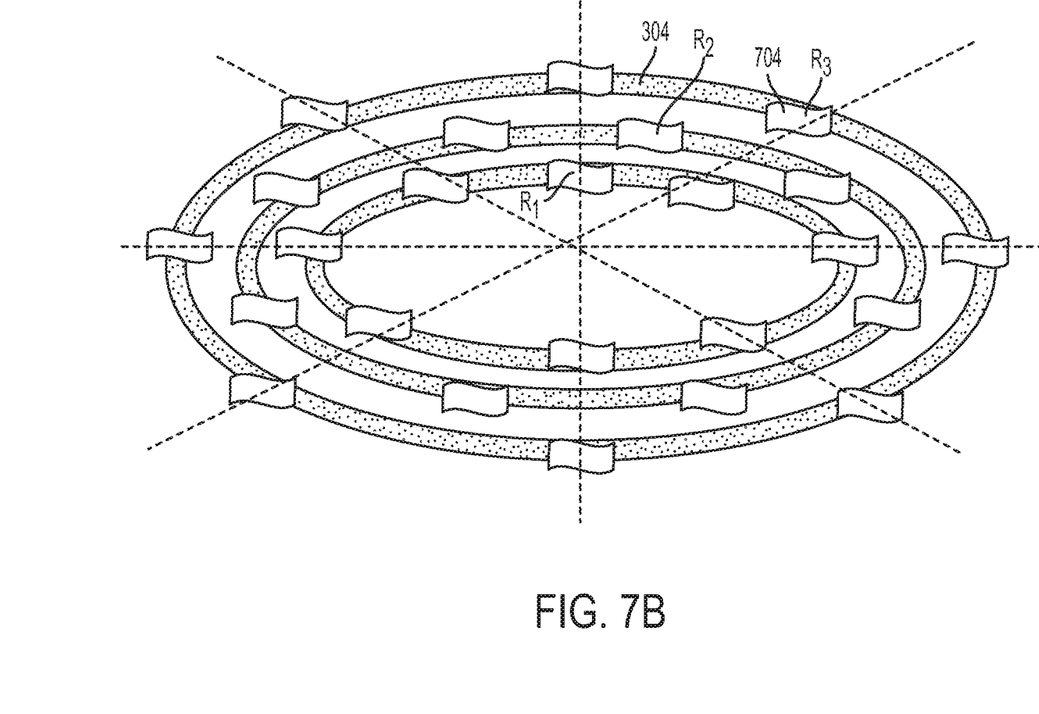
FIG. 7B illustrates piezoelectric actuators on a series or plurality of concentric rings being turned on in an alternating sequence, according to one or more embodiments.

FIG. 7B illustrates an embodiment wherein the piezoelectric components/actuators 302 on the concentric rings 304 are turned on so as to create an alternating sequence of traveling/standing waves 704 on the stator rings 304 (i.e., the traveling waves 704 at different radial positions R1, R2, R3 on the rings 304 are at different angular positions).

Rotation Speed and Duration

Figure 8A:
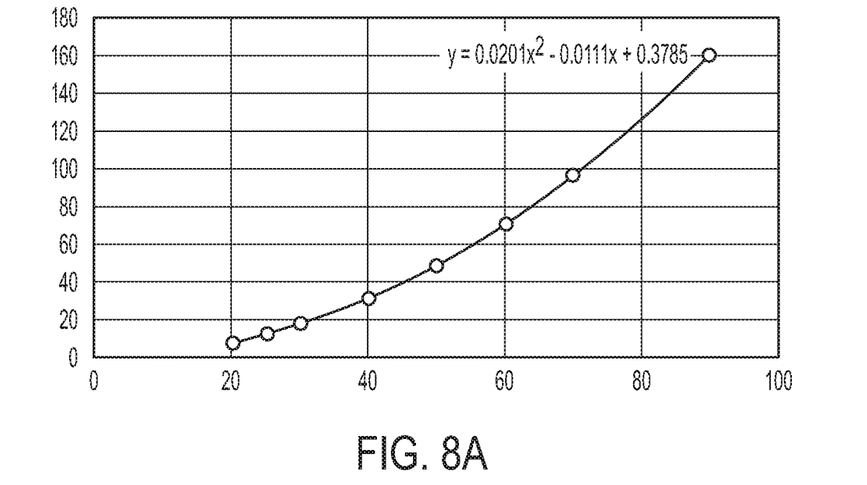
FIG. 8A plots torque output as a function of rotor member diameter, according to one or more embodiments.

FIG. 8A illustrates that as the diameter of the rotor member 202 and stator 204 increases, the torque increases. This relationship is beneficial for transferring torque to the rotor shaft 200. Furthermore, as discussed above, coupling a plurality of the stators 204 and rotor members 202 further adds torque to the motor's output.

Figure 8B:
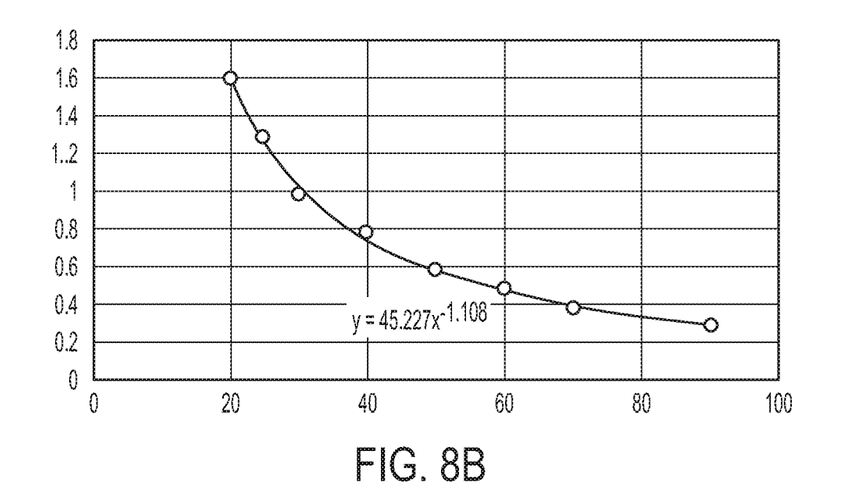
FIG. 8B plots rotor member speed as a function of rotor member diameter, according to one or more embodiments.

FIG. 8B illustrates that as diameter of the rotor member 202 and stator 204 increases, the speed of the rotor member decreases. In one embodiment, this relationship is used to rotate the shaft slowly so as to advantageously mitigate the bowing of the shaft connected to the rotor member (without being bound to particular scientific theory, slow rotation providing slow thermal cooling of the engine rotor may provide superior results). In one embodiment, smaller diameter motors are slowed down to keep the traveling waves on all the stators at a constant speed.

The piezoelectric motor rotates the rotor at one or more speeds, using one or more torques, and/or for one or more durations, so as to reduce or prevent the thermal bowing of the rotor in the temperature differential. Examples of rotation speeds include, but are not limited to, low speeds such as between 0.5-2.0 revolutions per minute (rpm).

Rotation of the rotor includes, but is not limited to, pulsed rotation, continuous rotation, a combination of both pulsed rotation and continuous rotation, clocked rotation, and/or sporadic rotation.

In one periodic pulsing scheme, torque is applied after a plurality of minutes (e.g. every 5-15 minutes) so that the rotor rotates a partial turn or in increments. In one embodiment, partial turns are 'clocked,' e.g., for a one-half turn. In another example, the pulse provides random rotor movement. In one embodiment, pulse modulation is achieved by programming the piezoelectric motor to transfer increments of torque. In one embodiment, the piezoelectric motor rotates the shaft by turning the shaft in one or more increments comprising a partial revolution of the shaft.

In one example, the rotation speed and duration are such that the probability of a compressor rub is less than e-8 per flight-hour.

Piezoelectric Motor Positioning

Figure 9:
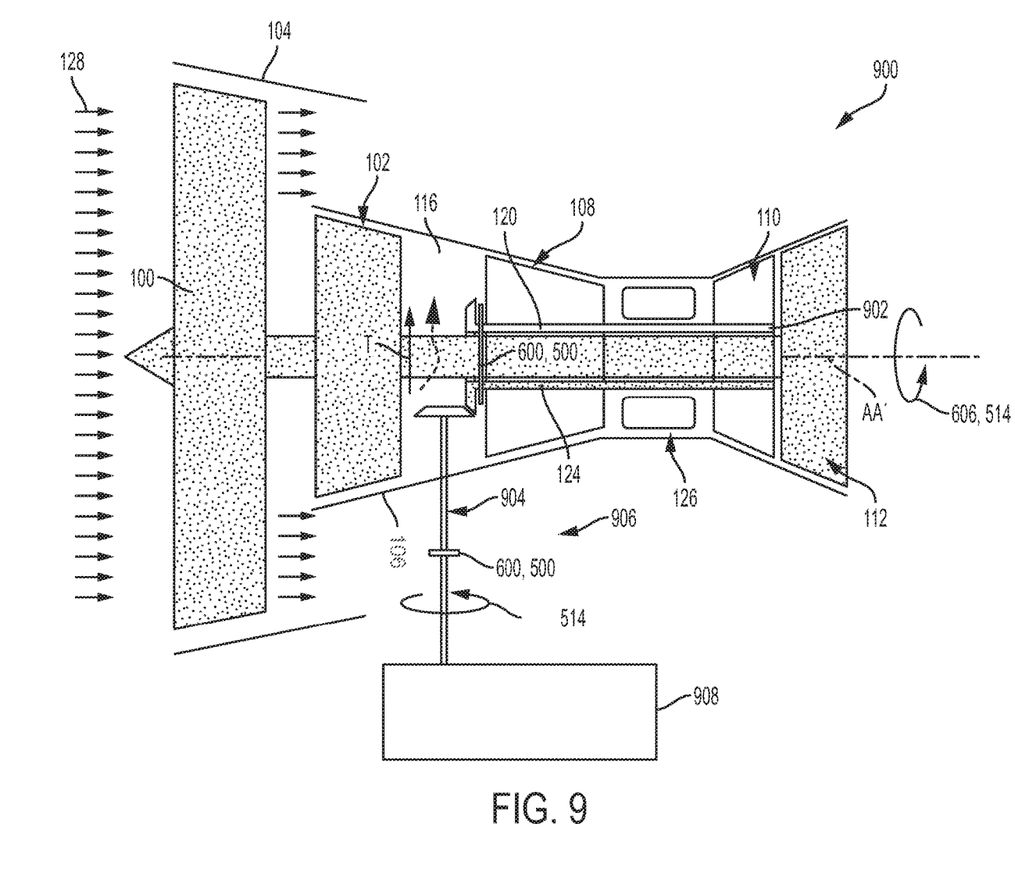
FIG. 9 illustrates an aircraft engine assembly comprising a piezoelectric motor according to one or more embodiments.

FIG. 9 illustrates a gas turbine engine 900 comprising a rotor shaft 902 showing positioning of the piezoelectric motor 600, 500 on the rotor shaft 902 and/or on the drive shaft 904 in a transmission 906 connecting the rotor shaft 902 to a gearbox 908. Therefore, shaft 902 comprises shaft 200, 510 and/or shaft 904 comprises shaft 200, 510.

In one embodiment, the casing 106, 104 and nacelle 140 housing the rotor shaft 902 comprise trapped air 116 after the engine 900 is shut down and the rotor shaft 902 is cooling down. The trapped air 116 creates a temperature gradient T perpendicular to the longitudinal axis AA' of the rotor shaft 902. Thus, FIG. 9 illustrates an aircraft engine assembly, comprising a gas turbine engine 900 including a rotor shaft 902, the rotor shaft 902 having a longitudinal axis AA'; a nacelle 140 and casing 106, 104 housing the rotor shaft 902 and comprising trapped air 116 creating a temperature gradient T perpendicular to the longitudinal axis AA'; and means (circuit 1114) for rotating 606, 514 the rotor shaft 902 about axis AA' using a piezoelectric motor 600, 500, the rotating 606, 514 reducing or preventing thermal bowing B of the rotor shaft 902 in the temperature gradient T.

Process Steps

Figure 10:
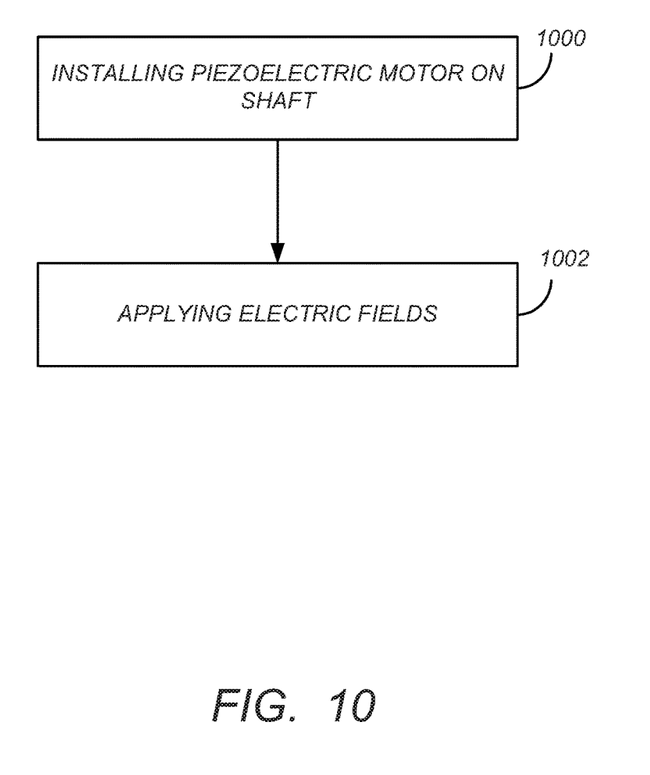
FIG. 10 is a flowchart illustrating a method of mitigating rotor shaft bow, according to various embodiments.

FIG. 10 is a flowchart illustrating a method of installing a piezoelectric motor 600 and rotating 606, 514 a rotor shaft 902 in an aircraft engine 900 using the piezoelectric motor 600, 500. Typically, the piezoelectric motor 600, 500 drives the rotor shaft 902 when the rotor shaft 902 is cooling down in a temperature gradient T perpendicular to a longitudinal axis AA' of the rotor shaft 902, thereby reducing or preventing thermal bowing B of the shaft 902 in the temperature gradient.

Examples of the rotor shaft 902 include a low-pressure or a high-pressure shaft in a 2-spool engine 900, or a low-pressure or intermediate-pressure shaft in a 3 spool engine.

The method comprises the following steps.

Block 1000 represents obtaining, installing, and/or connecting the piezoelectric motor 600, 500 on a rotor shaft 902 and/or drive shaft 904 connected to the rotor shaft 902 via a transmission 906.

In one embodiment, the piezoelectric motor 600 comprises one or more stators 204 and one or more rotor members 202 disposed around at least one shaft 200 selected from the rotor shaft 902 and the drive shaft 904, wherein the rotor members 202 are connected to the shaft 200, as illustrated in FIG. 2.

In another embodiment, the piezoelectric motor 500 comprises a plurality of piezoelectric actuators 506 disposed on an inner surface 512 of an annulus 504 around the shaft 510, as illustrated in FIG. 5. This embodiment provides enhanced spatial integration of the piezoelectric motor 500.

In yet another embodiment, the piezoelectric motor 400 comprises a plurality of the stators 204 and a plurality of the rotor members 202 alternately disposed in a stack 402, wherein one or more stators are paired with a surface 210 of a rotor member, as illustrated in FIG. 4.

In yet another embodiment, the one or more stators 204 each comprise piezoelectric actuators 302 disposed in a concentric ring 304 around the shaft 200, as illustrated in FIG. 3.

Such configurations might be installed on the accessory gearbox 908, within the transmission 906 gearing, or directly onto the engine rotor shaft 902. Thus, one or more embodiments of the present invention provide a good solution for spatially restrictive installations such as on the Boeing 737 MAX. In one or more embodiments, the piezoelectric motor comprises a flat, pancake profile for easier integration into the engine.

The piezoelectric actuators 302 or concentric rings 204a comprise piezoelectric material. Examples of piezoelectric material include materials selected from, but not limited to, quartz, berlinite ($AlPO_4$), topaz, tourmaline-group minerals, lead titanate ($PbTiO_3$), barium titanate ($BaTiO_3$), lead zirconate titanate ($Pb[Zr_xTi_{1-x}]O_3$ with $0 \leq x \leq 1$), potassium niobate ($KNbO_3$), sodium tungstate ($Na_2WO_3$), $Ba_2NaNb_5O_5$, $Pb_2KNb_5O_{15}$, zinc oxide (ZnO)-wurtzite structure, sodium potassium niobate, bismuth ferrite ($BiFeO_3$), sodium niobate $NaNbO_3$, bismuth titanate $Bi_4Ti_3O_{12}$, sodium bismuth titanate $NaBi(TiO_3)_2$, and III-V and II-VI semiconductors.

In one embodiment, the piezoelectric material is selected based on its suitability for use in the engine environment.

In one embodiment, the rotor member 202 comprises a metal. Examples of the metal include, but are not limited to, steel, iron, titanium, and/or alloys comprising steel, iron, and/or titanium. In one embodiment, the stator comprises the piezoelectric material on a substrate material including, but not limited to, a metal selected from, for example, steel, iron, titanium, and/or alloys comprising steel, iron, and/or titanium.

Block 1002 represents driving the rotor shaft 902 using the piezoelectric motor 600, 500, comprising applying one or more electric fields to actuate the piezoelectric motor, thereby rotating the shaft 200.

As discussed previously, air 134 inputted into the nacelle 140 is trapped in the engine 900, creating a temperature gradient T perpendicular to the longitudinal axis AA' of the rotor shaft 902. The rotor shaft 902 is then rotated 514, 606 using the piezoelectric motor when the rotor shaft 902 is cooling down in the temperature gradient T, thereby reducing or preventing thermal bowing B of the rotor shaft 902 in the temperature gradient T.

In one embodiment, the rotating 606, 514 comprises turning the shaft 200, 508 by one or more partial turns (each partial turn less than one revolution). In another embodiment, the rotating 606, 514, 404 comprises turning or spinning the shaft 200 by more than one revolution.

In one embodiment, the electric field E applied to the one or more stators 204, 502 generates one or more traveling waves 602, 702, 704 in the stators 204, 502. The traveling wave 602, 702, 704 press against the one or more rotor members 202, 508, or press the stators 204, 502 against a rotor member 202, 508 to deliver mechanical output to the one or more rotor members 202, thereby rotating 404, 606, 514 the rotor member 202 and the shaft 508, 200 connected to or comprising the rotor member 202, 508.

In another embodiment, the more electric fields E are applied to a plurality of stators 204 paired with a surface 210 of a rotor member 202. In response to the electric fields E, the stators 204 press against different radial positions R1, R2, R3 on the surface 210 of the rotor member 202, thereby delivering torque 606a, 514a, 404a to the surface 210 and the rotor member 202 and the shaft 200 connected to the rotor member 202.

In another embodiment, the electric fields E are applied to the actuators 302 according to a sequence such that the piezoelectric actuators 302 sequentially press against the surface 210 of the rotor member 202 and deliver torque 606a, 514a, 404a to the surface 210 and the rotor member 202 and the shaft 200 connected to the rotor member 202.

In the embodiment of FIG. 5, the electric fields E are sequentially applied to the piezoelectric actuators 506 such that the actuators 506 sequentially press against the outer surface 508 of the shaft 510, delivering torque 606a, 514a, 404a to the outer surface 508 and rotating 514 the shaft 510.

In one embodiment, the torque is applied directly onto the rotor shaft 902 by the piezoelectric motor 600 mounted on the rotor shaft 902. In another embodiment, the torque 606a, 514a, 404a is applied directly to a drive shaft 904 (e.g., a tower shaft or a shaft in an auxiliary gearbox 908) connected to the rotor shaft 902. A clutch, attached to the drive shaft 904, engages the drive shaft to the rotor shaft 902, e.g., after the engine 900 shutdown, so that the drive shaft 904 rotates 514, 606, 404 the rotor shaft 902.

The drive shaft 904 embodiment eliminates the problem of allowing enough clearance between the stator and rotor shaft such that the rotor shaft does not rub and damage the stator.

In one embodiment, the piezoelectric motor 600, 500 is activated to rotate the rotor shaft 902 soon/immediately after engine shut down so as to minimize aircraft departure delays. In another embodiment, the piezoelectric motor is activated to rotate the rotor prior to engine start (i.e., prior to motoring the engine, and wherein motoring refers to rotating the shaft after engine start but prior to fuel on).

System Dimensions

In one or more embodiments, the piezoelectric motor system described herein has weight and dimensions optimized for compactness to overcome weight and space constraints, e.g., so that the hydraulic/pneumatic motor system can be integrated into the engines of smaller aircraft such as a Boeing 737 Max. In one example, the piezoelectric motor has a diameter of at most 6", is at most 12" long, and has a weight of at most 25 pounds. However, the hydraulic/pneumatic motor can be implemented in all aircraft, including, but not limited to, Boeing 787, 777, and 747 aircraft.

Example System Features

One or more embodiments of the ETM system comprise a piezoelectric motor system installed in an aircraft using components such that:

the aircraft is capable of being dispatched for at least 10 days after a failure of the ETM;

failure of the ETM system does not require line maintenance to dispatch the aircraft;

failure of the ETM does not interfere with engine operation, and in particular, does not interfere with engine start;

failure rate of the ETM is e-5 per flight hour or better;

the ETM is sufficiently reliable that a backup scheme is not required (e.g., the ETM has a reliability of at least e-6 per flight hour or at least e-7 per flight hour);

the ETM has a lock out feature, in case unforeseen issues arise and the system must be easily disabled;

energy demands for rotating the rotor and reducing the thermal bowing are reduced as compared to systems using an electric motor to rotate the rotor; and/or the installation and certification is easier as compared to systems using an electric motor to rotate the rotor (e.g., the ETM system does not include a new ignition source or fuel source adding to engine fire protection designs).

Processing Environment

Figure 11:
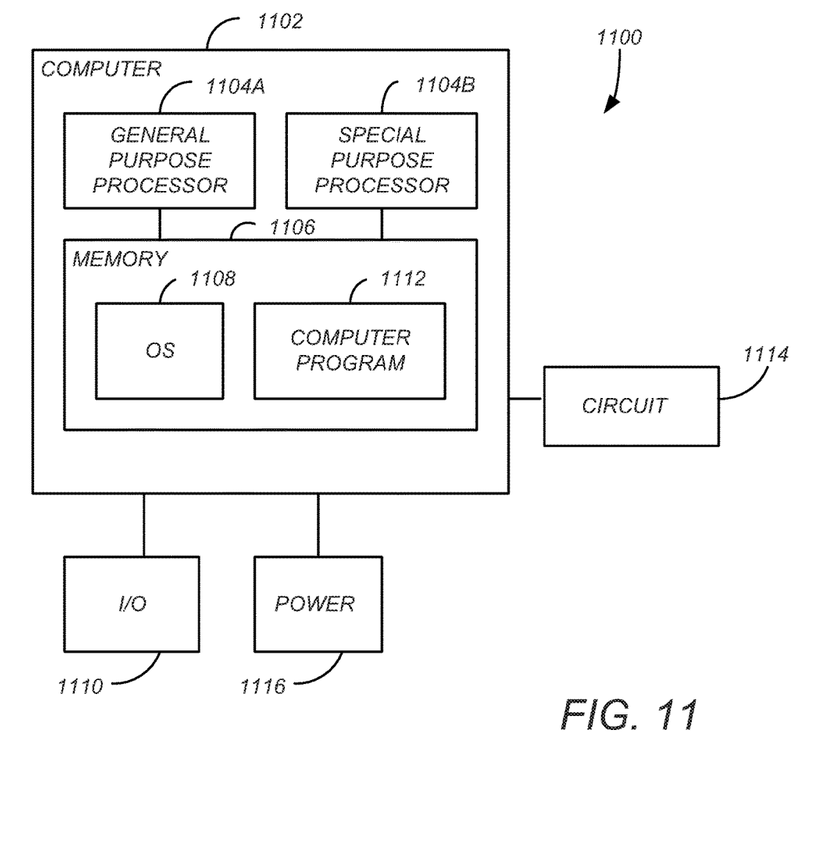
FIG. 11 illustrates a hardware environment for operating the piezoelectric motor, according to one or more embodiments.

FIG. 11 illustrates an exemplary system 1100 comprising a computer 1102 that could be used to implement processing elements needed to control rotation of the piezoelectric motor 600, 500 systems described herein (e.g., selection of sequence, timing and magnitude of the electric fields E). The computer 1102 is typically located on the aircraft, e.g., but not limited to, in a box mounted on the engine fan case or inside the aircraft.

The computer 1102 comprises a processor (comprising general purpose processor 1104A and special purpose processor 1104B) and a memory, such as random access memory (RAM) 1106. Generally, the computer 1102 operates under control of an operating system 1108 stored in the memory 1106, and interfaces with the user to accept inputs and commands (analog or digital signals) and to present results through an input/output module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1110 are tangibly embodied in the memory 1106, thereby making a computer program product or article of manufacture. As such, the terms "article of manufacture," "program storage device" and "computer program product" as used herein are intended to encompass a computer program accessible from any computer readable device or media.

In one embodiment, computer 1102 comprises one or more field programmable gate arrays (FPGAs).

FIG. 11 further illustrates a circuit 1114 connected to the one or more stators 204, wherein the shaft 200 rotates when the one or more stators 204 press against the one or more rotor members 202 in response to one or more electric fields E applied by the circuit 1114 onto the one or more stators 204.

In one embodiment, the computer 1102 comprises a controller activating the piezoelectric motor 600 by regulating the applied electric fields E applied to the motor 600 via a circuit 1114 connected to the computer 1102 and the stators 204. In one example, the circuit 1114 comprises a voltage source connected to the concentric rings 204a or piezoelectric actuators 302 via one or more switches, the voltage source applying the one or more electric fields E to the concentric rings 204a or piezoelectric actuators 302 when the switches are closed.

In one embodiment, an Electronic Engine Control (EEC) unit sends a digital request to the controller via I/O 1110 to reduce, increase, and/or modify timing sequence of the electric fields E via applied by the circuit 1114, thus controlling compressor rotor 902 speeds. In yet another embodiment, the computer 1102 provides status to the EEC via I/O 1110 so that the controller and/or the EEC monitor system monitor performance and/or control the rotation of the rotor shaft 902.

In one embodiment, the computer 1102 receives a signal through I/O 1110 from an engine shut off switch after engine shut down. In response, the computer 1102 activates the circuit 1114 and the circuit 1114 applies the one or more electric fields E to the piezoelectric motor 600. In one embodiment, the computer 1102 activates the piezoelectric motor 600 to rotate the rotor 108 prior to engine start (i.e., prior to motoring the engine).

In another embodiment, the duration of rotation is optimized by having the computer 1102 estimate the amount of bow (based on time since last engine shutdown) and calculate the required rotation duration to be implemented. Various instrumentation to monitor the bowing can include accelerometers already used for vibration monitoring or microwave-based gap measuring sensors.

FIG. 11 further illustrates a power source 1116 for providing power to the system 1100.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An aircraft engine assembly, comprising:
  a gas turbine engine including a rotor shaft, the rotor shaft having a longitudinal axis;
  a nacelle housing the rotor shaft and comprising trapped air creating a temperature gradient perpendicular to the longitudinal axis; and
  means for rotating the rotor shaft using a piezoelectric motor, the rotating reducing or preventing thermal bowing of the rotor shaft in the temperature gradient.

2. The aircraft engine assembly of claim 1, wherein the means further comprises:
  the piezoelectric motor comprising one or more stators and one or more rotor members disposed around at least one shaft selected from a rotor shaft and a drive shaft in a transmission connected to the rotor shaft, wherein the rotor members are connected to the at least one shaft; and
  a circuit connected to the one or more stators, wherein the rotor rotates when the one or more stators press against the one or more rotor members in response to one or more electric fields applied by the circuit onto the one or more stators.

3. The aircraft engine assembly of claim 2, wherein:
  the electric fields generate one or more traveling waves in the stators, and
  the traveling waves press against the one or more rotor members, thereby rotating the one or more rotor members and the rotor shaft connected to the one or more rotor members.

4. The aircraft engine assembly of claim 2, further comprising a plurality of the stators and a plurality of the rotor members alternately disposed in a stack.

5. The aircraft engine assembly of claim 2, further comprising a plurality of the stators paired with a surface of one of the rotor members, wherein the plurality of the stators press against different radial positions on the surface.

6. The aircraft engine assembly of claim 2, further comprising one or more of the stators paired with a surface of one of the rotor members, wherein:
  the one or more of the stators each comprise piezoelectric actuators disposed in a concentric ring around the rotor shaft or the drive shaft, and
  the actuators sequentially press against the surface when the circuit applies the electric fields to each of the actuators, thereby delivering torque to the surface.

7. The aircraft engine assembly of claim 1, wherein the means further comprises:
  a plurality of piezoelectric actuators disposed on an inner surface of an annulus around the at least one shaft; and
  a circuit connected to the actuators, wherein the at least one shaft rotates when the actuators sequentially press against an outer surface of the at least one shaft in response to the electric fields applied by the circuit.

8. An aircraft engine assembly, comprising:
  a gas turbine engine including a rotor shaft; and
  a piezoelectric motor attached to at least one shaft selected from the rotor shaft and a drive shaft, wherein the piezoelectric motor rotates the rotor shaft in response to one or more electric fields.

9. The aircraft engine assembly of claim 8, wherein:
the piezoelectric motor comprises one or more stators and one or more rotor members disposed around the at least one shaft,
the rotor members are connected to the at least one shaft; and
the rotor rotates when the one or more stators press against the one or more rotor members in response to the one or more electric fields applied onto the one or more stators.

10. The aircraft engine assembly of claim 9, wherein:
the electric fields generate one or more traveling waves in the stators, and
the traveling waves press against the one or more rotor members, thereby rotating the one or more rotor members and the rotor shaft connected to one or more rotor members.

11. The aircraft engine assembly of claim 9, further comprising a plurality of the stators and a plurality of the rotor members alternately disposed in a stack.

12. The aircraft engine assembly of claim 9, further comprising a plurality of the stators paired with a surface of one of the rotor members, wherein the plurality of the stators press against different radial positions on the surface.

13. The aircraft engine assembly of claim 9, further comprising one or more of the stators paired with a surface of one of the rotor members, wherein:
the one or more stators each comprise piezoelectric actuators disposed in a concentric ring around the rotor shaft or the drive shaft, and
the actuators sequentially press against the surface in response to the one or more electric fields applied to each of the actuators, thereby delivering torque to the surface.

14. The aircraft engine assembly of claim 8, wherein:
the piezoelectric motor comprises a plurality of piezoelectric actuators disposed on an inner surface of an annulus around the rotor shaft or the drive shaft, and
the rotor shaft or the drive shaft rotates when the actuators sequentially press against an outer surface of the shaft in response to the one or more electric fields applied to the actuators.

15. A method of rotating a shaft in an aircraft engine, comprising:
obtaining a piezoelectric motor comprising one or more stators and one or more rotor members disposed around at least one shaft selected from a rotor shaft and a drive shaft in an aircraft engine,
driving a shaft in an aircraft engine using a piezoelectric motor, wherein the driving comprises:
connecting the one or more rotor members to the shaft; and
generating one or more traveling waves in the stators such that the traveling waves deliver mechanical output to the one or more rotor members and rotate the rotor shaft or the drive shaft.

16. The method of claim 15, further comprising rotating the rotor shaft using the piezoelectric motor when the rotor shaft is cooling down in a temperature gradient perpendicular to a longitudinal axis of the rotor shaft, thereby reducing or preventing thermal bowing of the rotor shaft in the temperature gradient.

17. A method of rotating a shaft in an aircraft engine, comprising:
providing a piezoelectric motor comprising actuators paired with a surface of a rotor member; and
connecting the rotor member to at least one shaft in an aircraft engine; and
driving the at least one shaft using the piezoelectric motor, wherein the driving comprises applying one or more electric fields to the actuators such that the actuators press against different radial positions on the surface, delivering torque to the rotor member and the at least one shaft connected to the rotor member.

18. The method of claim 17,
wherein the actuators are stators each comprising piezoelectric actuators disposed in a concentric ring around the at least one shaft selected from a rotor shaft and a drive shaft in a transmission connected to the rotor shaft;
wherein the driving further comprises sequentially applying one or more electric fields to the actuators such that the actuators sequentially press against the surface, delivering torque to the rotor member and the at least one shaft connected to the rotor member.

19. The method of claim 17, wherein:
providing the piezoelectric motor comprising a plurality of the actuators comprising piezoelectric actuators disposed on an inner surface of an annulus around the at least one shaft selected from the rotor shaft and a drive shaft in a transmission connected to the rotor shaft, wherein the driving further comprises sequentially applying one or more electric fields to the actuators such that the actuators sequentially press against an outer surface of the at least one shaft, delivering torque to the at least one shaft.

20. The method of claim 17, further comprising rotating the rotor shaft using the piezoelectric motor when the rotor shaft is cooling down in a temperature gradient perpendicular to a longitudinal axis of the rotor shaft, thereby reducing or preventing thermal bowing of the rotor shaft in the temperature gradient.

* * * * *